G. P. ALTENBERG.
CASING FOR VACUUM INSULATED VESSELS.
APPLICATION FILED MAR. 10, 1917.
1,293,292.
Patented Feb. 4, 1919.
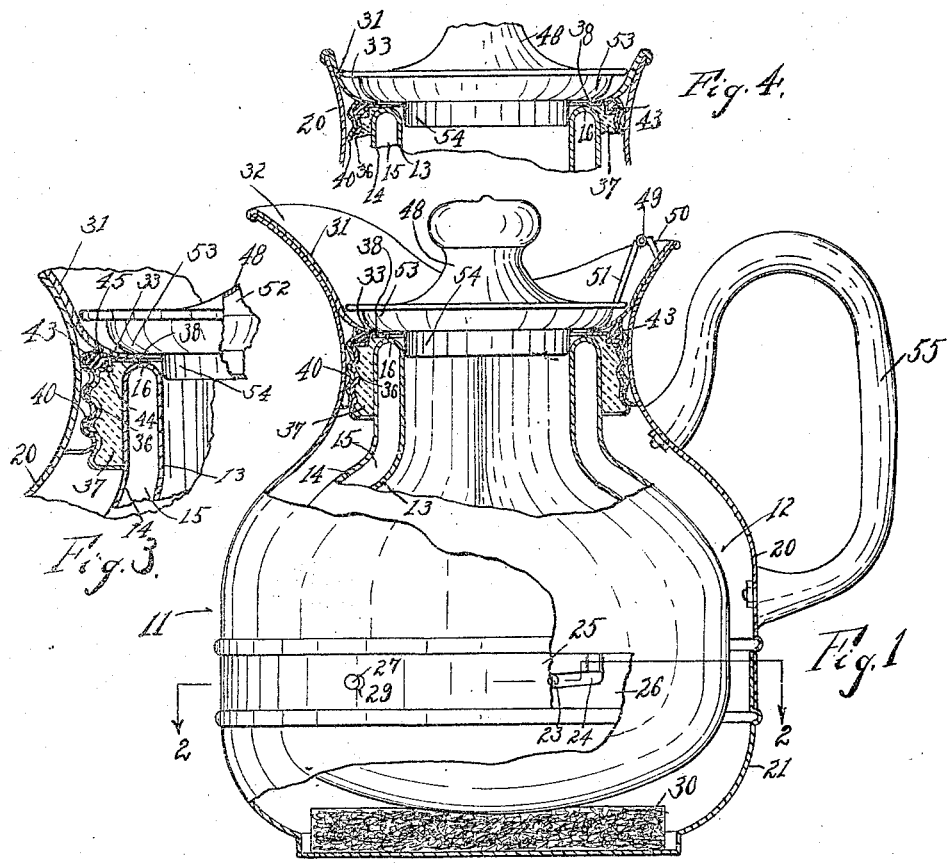
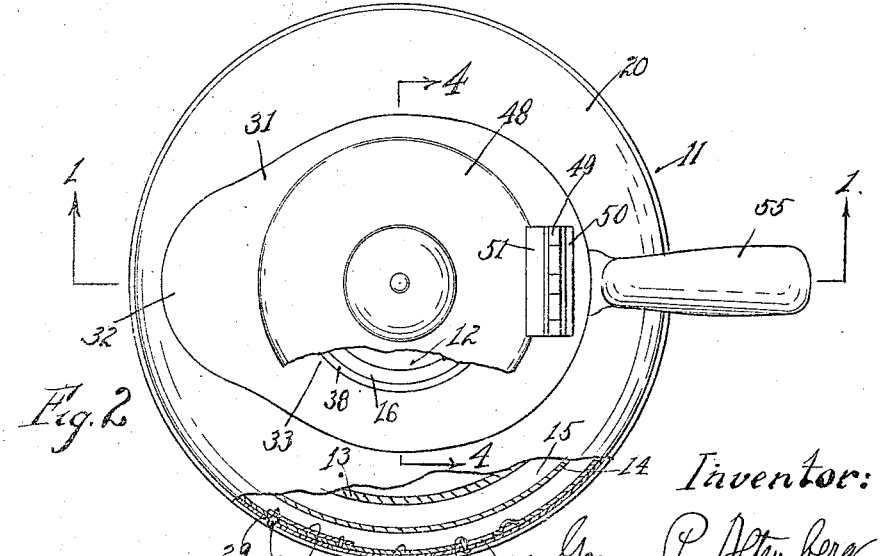
Inventor:
George P. Altenberg,
by his Attorney.

UNITED STATES PATENT OFFICE.

GEORGE P. ALTENBERG, OF CINCINNATI, OHIO, ASSIGNOR TO THE ICY-HOT BOTTLE COMPANY, OF CINCINNATI, OHIO, A CORPORATION OF WEST VIRGINIA.

CASING FOR VACUUM-INSULATED VESSELS.

1,293,292.

Specification of Letters Patent.

Patented Feb. 4, 1919.

Application filed March 10, 1917. Serial No. 154,027.

*To all whom it may concern:*

Be it known that I, GEORGE P. ALTENBERG, a citizen of the United States, residing at Cincinnati, in the county of Hamilton and State of Ohio, have invented certain new and useful Improvements in Casings for Vacuum-Insulated Vessels, of which the following is a specification.

My invention relates to vacuum-insulated pots, pitchers or similar vessels, hereinafter for convenience referred to as pots, adapted for serving coffee, chocolate, tea, milk, cream, or other beverages.

It is the object of my invention to provide a heat insulated vessel with a casing provided with a pouring wall above and surrounding the mouth of the vessel and having a lip which forms a continuation of the pouring wall coacting with the mouth of the vessel, and means for causing pressure between said mouth and lip so as to form a liquid-proof joint between the vessel and wall; further, to form a joint of the character mentioned which provides an all metal and glass surface for contact by the liquid adapted to be contained in or poured from the vessel; and, further, to provide such contact-faces in such manner that there is a continuous inwardly and downwardly sloping wall having a resilient lip at its inner edge forming connection with the frangible vessel, so that all liquid may be directed into said vessel from said wall when the pot is in upright position.

The invention will be further readily understood from the following description and claims, and from the drawing, in which latter:

Figure 1 is a side elevation of a pot embodying my invention, partly broken away and partly shown in central vertical section on the line 1—1 of Fig. 2.

Fig. 2 is a plan view of the same, partly in section on the line 2—2 of Fig. 1.

Fig. 3 is an enlarged sectional detail on the line 1—1 of Fig. 2; and,

Fig. 4 is a detail in vertical cross-section taken on a line in the plane of the line 4—4 of Fig. 2.

The pot comprises a casing exemplified at 11, and a vessel exemplified at 12, the vessel being shown as a heat insulated vessel comprising an inner wall 13 and an outer wall 14, having a vacuum-insulated space 15 therebetween, the inner and outer walls being connected at the mouth of the vessel by an annular cross-seal 16. The vessel is usually made of glass. The cross-seal is, in practice, liable to have variations therein in a plane perpendicular to the axis of the vessel owing to the methods of manufacture of vessels of this character.

In the present exemplification, the casing of the vessel comprises an upper member 20 and a lower member 21, within which the vessel is received. The casing members are detachably connected by suitable means, exemplified as bayonet connections comprising inwardly extending pins 23 rigidly secured to the upper member and received in bayonet slots 24 in the lower member, the said members being provided with telescoping flanges 25, 26, in which said respective pins and slots are located. A locking pin 27 on a spring strip 28 secured to the inner face of the lower member projects through a suitable aperture in said lower member and coacts with a locking aperture 29 in the flange 25 of the upper member for locking the casing members in connected relations. A cushion 30 is shown interposed between the bottom of the vessel and the bottom of the casing.

The casing is provided with a pouring wall 31, shown as a downwardly extending inwardly sloping closed wall, provided with a pouring channel 32, the said wall terminating at its bottom in an inner lateral preferably slightly downwardly extending lip 33, exemplified as a continuation of said downwardly extending inwardly sloping closed pouring wall, the said lip being preferably a resilient lip formed of resilient material, as for example, German silver. The said lip coöperates with the vessel, for forming a joint between said vessel and pouring wall of the casing, which forms an all metal and glass pouring surface and wall for the liquid. The resilience of the lip permits the lip to adapt itself to any inequalities or irregularities there may be between the vessel and lip.

Suitable means are provided for connecting the mouth of the vessel and the pouring wall. Such means are exemplified as comprising a screw-ring 36, instanced as secured to the shell by means of a body 37 of cement, such as plaster of Paris, connecting the neck of the vessel with the screw-ring. The screw-ring is provided with an inwardly extending flange 38, which forms a resilient lip, as by making the screw-ring of resilient material, such as German silver, pressure being applied axially of the vessel for forcing the spring-lip 38 and the cross-seal at the mouth of the vessel into contact with each other throughout the line of contact between the inner edge of said spring-lip and said cross-seal, the said spring-lip conforming to any variations there may be in said annular cross-seal, so that there may be direct contact along said annular line of contact between said spring-lip 38 and said cross-seal for forming a liquid-proof joint between said spring-lip and cross-seal, the body 37 of cement being removed from the pouring edge of said lip. When the cement has set the pressure holding the lip and mouth together is removed.

A coöperating screw-ring 40 is suitably secured in the casing under the pouring wall 31. The screw-ring 36 is arranged to be threaded into the screw-ring 40 for connecting the upper part of the casing and the vessel and for forcing the mouth of the vessel toward the spring-lip 33. In the present instance, the lip 38 is interposed between said mouth and lip 33. The pressure exerted between the cross-seal of the mouth of the vessel, or the lip 38, and the lip 33, causes intimate contact with the lip 33. The lip 33, being resilient, conforms to any irregularities there may be in the mouth of the vessel, or any irregularities communicated thereby to the lip 38.

The lip 33 is preferably tapered toward its inner edge for aiding in ready resilience of the same, and the lip 38 may be similarly tapered, if desired, for a similar purpose.

The pouring wall and lip projecting therefrom preferably have a continuously downwardly and inwardly sloping face and connect with the downwardly and inwardly sloping face of the cross-seal at the mouth of the vessel for readily draining any liquid thereon into the vessel and preventing the formation of puddles or rings of liquid thereon.

A compressible cushion 43 is arranged to surround the lips, being instanced as a cushion-ring of rubber, received in an annular recess 44 in the ring 36. When the vessel and casing are connected, the cushion-ring is compressed between the wall of said recess and the walls of a recess 45 formed by the under face of the pouring wall 31 and the screw-ring 36, for aiding in forming a liquid seal and removed by the lips from danger of contact by the flowing liquid poured into or out of the vessel.

The casing is preferably provided with a cover 48 exemplified as hinged to the casing by means of a hinge 49, the butts 50 and 51 of the hinge being respectively secured to the rear upper portion of the pouring wall of the casing, and to the cover, the cover being so arranged as to readily swing inwardly and downwardly above the mouth of the vessel. The cover is instanced as a hollow cover having a dead air space 52 between the upper and lower walls thereof. The lower wall of the cover is provided with a cross-sectionally rounded annular closing face 53 arranged to contact the lip at the mouth of the vessel, exemplified as the lip 33, for forming a metal to metal closure at said mouth. The cover is shown as having an annular downwardly projecting portion 54 acting as a stopper received within the mouth of the vessel.

The casing may be provided with a suitable handle 55.

Having thus fully described my invention, what I claim as new, and desire to secure by Letters Patent, is:

1. In combination, a vessel comprising an inner wall and an outer wall connected at the mouth of the vessel by a cross-seal and having a vacuum insulated space between said walls, a casing for said vessel provided with a resilient lip releasably received above and around said cross-seal and having a radially outwardly and upwardly extending wall receding outwardly away from said outer wall and forming a drain-wall sloping toward said outer wall and mouth and surrounding said lip, and means for pressing said cross-seal and resilient lip toward one another.

2. In combination, a vessel comprising an inner wall and an outer wall connected at the mouth of the vessel by a cross-seal and having a vacuum-insulated space between said walls, a casing for said vessel provided with a lip releasably received over and around said cross-seal and having a radially outwardly and upwardly extending wall receding outwardly away from said outer wall and forming a drain-wall sloping toward said outer wall and mouth and surrounding said lip, means for pressing said cross-seal and lip toward one another, and a cover pivoted to said casing and received within said drain-wall.

3. In combination, a vessel comprising an inner wall and an outer wall connected at the mouth of the vessel by a cross-seal and having a vacuum-insulated space between said walls, a casing for said vessel provided with a lap releasably received over and around said cross-seal and having a radially outwardly and upwardly extending wall receding outwardly away from said outer wall and forming a drain-wall sloping toward said outer wall and mouth and surrounding said lip, means for pressing said cross-seal and lip toward one another, and a cover pivoted to said casing and received within said drain-wall, said cover provided with a depending portion received below said lip within said mouth.

4. In combination, a vessel comprising an inner wall and an outer wall connected at the mouth of the vessel by a cross-seal and having a vacuum-insulated space between said walls, a casing for said vessel provided with a lip over said mouth and a radially and upwardly receding wall forming a drain-wall sloping toward said mouth surrounding said lip, a second lip around said mouth between said first-named lip and said mouth, and means for pressing said lips and mouth toward one another.

5. In combination, a vessel comprising an inner wall and an outer wall connected at the mouth of the vessel and having a vacuum insulated space between said walls, a casing for said vessel provided with a lip received over said mouth, and means surrounding said vessel proximate to said mouth and having interengaging parts for releasably securing said vessel in said casing and pressing said lip and mouth toward one another for forming a leak-proof joint between said lip and mouth.

6. In combination, a vessel comprising an inner wall and an outer wall connected at the mouth of the vessel and having a vacuum insulated space between said walls, a screw-ring secured to said vessel proximate to said mouth, a casing for said vessel provided with a lip releasably received above said mouth, and means in said casing coacting with said screw-ring, and arranged for releasably connecting said vessel and casing and pressing said lip and mouth toward one another for forming a leak-proof joint between said lip and mouth.

7. In combination, a vessel comprising an inner wall and an outer wall connected at the mouth of the vessel and having a vacuum-insulated space between said walls, a screw-ring secured to said vessel and having a lip received over said mouth, and a casing for said vessel provided with a lip received over said first-named lip, said casing provided with a screw coacting with said screw-ring for pressing said lips toward one another.

8. The combination of a frangible vessel having a mouth, a metal ring surrounding said mouth and provided with a laterally extending surface, a casing provided with an inner laterally extending metal lip coacting with said laterally extending surface for forming a joint, a compressible seal surrounding said joint, and means for forcing said laterally extending surface and said lip toward one another for compressing said seal.

9. The combination of a glass vessel having a mouth, a metal ring surrounding said mouth, said metal ring comprising a lip on said mouth and provided with a recess surrounding said lip, a casing provided with an inner laterally extending metal lip coacting with said first-named lip for forming a joint, a compressible seal surrounding said joint, and means for forcing said lips together and compressing said surrounding seal.

10. In combination, a vessel comprising an inner wall and an outer wall connected at the mouth of the vessel and having a vacuum-insulated space between said walls, a casing for said vessel provided with a lip above said mouth, and a radially and upwardly receding wall forming a drain wall sloping toward said mouth and surrounding said lip, a second lip around said mouth between said first-named lip and said mouth, one of said lips being resilient, and means for pressing said lips and mouth toward one another.

In testimony whereof, I have hereunto signed my name in the presence of two subscribing witnesses.

GEORGE P. ALTENBERG.

Witnesses:
M. F. HAWKINS,
DAWSON E. BRADLEY.

Copies of this patent may be obtained for five cents each, by addressing the "Commissioner of Patents, Washington, D. C."